(12) United States Patent
Ferris et al.

(10) Patent No.: US 8,909,784 B2
(45) Date of Patent: Dec. 9, 2014

(54) MIGRATING SUBSCRIBED SERVICES FROM A SET OF CLOUDS TO A SECOND SET OF CLOUDS

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1031 days.

(21) Appl. No.: 12/957,281

(22) Filed: Nov. 30, 2010

(65) Prior Publication Data

US 2012/0137003 A1    May 31, 2012

(51) Int. Cl.
*G06F 15/173* (2006.01)
*H04L 29/08* (2006.01)
*H04W 4/00* (2009.01)
*G06F 9/50* (2006.01)
*G06Q 10/10* (2012.01)

(52) U.S. Cl.
CPC ............ *H04L 67/10* (2013.10); *H04L 67/16* (2013.01); *H04L 67/22* (2013.01); *H04W 4/003* (2013.01); *G06F 9/5072* (2013.01); *G06Q 10/10* (2013.01); *G06Q 10/107* (2013.01)
USPC ........... 709/226; 709/218; 709/212; 709/213; 709/224

(58) Field of Classification Search
CPC ....... H04L 41/12; H04L 67/22; H04L 67/306; H04L 43/0835
USPC .......................... 709/226, 218, 212, 213, 224
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 8,417,938 B1* | 4/2013 | Considine et al. | 713/151 |
| 8,429,651 B2* | 4/2013 | Donnellan et al. | 718/1 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |

(Continued)

OTHER PUBLICATIONS

"rBuilder and the rPath Appliance Platform", 2007 rPath, Inc., www.rpath.com, 3 pgs.

(Continued)

*Primary Examiner* — Lan-Dai T Truong
(74) *Attorney, Agent, or Firm* — Lowenstein Sandler LLP

(57) ABSTRACT

A decision system for providing ranked candidate cloud computing environments to customers for migration of subscribed services. The decision system can receive user usage history data and compare parameters of subscribed services on a host cloud to candidate clouds. Based on the comparison, a rank of candidate clouds for migration of the subscribed services can be determined and supplied to the customer.

20 Claims, 8 Drawing Sheets

(56) References Cited

U.S. PATENT DOCUMENTS

| | | |
|---|---|---|
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0016214 A1 | 1/2011 | Jackson |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | DeHaan et al. |
| 2011/0055588 A1 | 3/2011 | DeHaan |
| 2011/0131335 A1 | 6/2011 | Spaltro et al. |
| 2011/0270968 A1* | 11/2011 | Salsburg et al. .............. 709/224 |
| 2011/0289329 A1* | 11/2011 | Bose et al. .................... 713/320 |
| 2013/0024424 A1* | 1/2013 | Prahlad et al. ................ 707/640 |
| 2013/0297800 A1* | 11/2013 | Considine et al. ............ 709/226 |
| 2013/0311551 A1* | 11/2013 | Thibeault ...................... 709/203 |

OTHER PUBLICATIONS

White Paper—"rPath Versus Other Software Appliance Approache", Mar. 2008, rPath, Inc., www.rpath.com, 9 pgs.

White Paper—"Best Practices for Buiding Virtual Appliances", 2008 rPath, Inc., www.rpath.com, 6 pgs.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments" U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al, "Methods and Systems for Verifying Software License Compliance in Cloud Computing Environments", U.S. Appl. No. 12/627,643, filed Nov. 30, 2009.

Ferris et al. "Systems and Methods for Service Aggregation Using Graduated Service Levels in a Cloud Network", U.S. Appl. No. 12/628,112, filed Nov. 30, 2009.

Ferris et al. "Methods and Systems for Generating a Software License Knowledge Base for Verifying Software License Compliance in Cloud Computing Environments", U.S. Appl. No. 12/628,156, filed Nov. 30, 2009.

Ferris et al, "Methods and Systems for Converting Standard Software Licenses for Use in Cloud Computing Environments", U.S. Appl. No. 12/714,099, filed Feb. 26, 2010.

Ferris et al, "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris at al., "Systems and Methods for Cloud-Based Brokerage Exchange of Software Entitlements", U.S. Appl. No. 12/714,302, filed Feb. 28, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris at al,, "Systems and Methods for or a Usage Manager for Cross-Cloud Appliances", U.S. Appl. No. 12/714,334, filed Feb. 26, 2010.

Ferris at al., "Systems and Methods for Delivery of User-Controlled Resources in Cloud Environments Via a Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

(56) References Cited

OTHER PUBLICATIONS

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

Ferris et al., "Systems and Methods for Combinatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud" U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deploymetn", U.S. Appl. No. 12/952,857, filed Nov. 23, 2010.

Ferris, et al., "System and Methods for Migrating Subscribed Services in a Cloud Deployment", U.S. Appl. No. 12/955,277, filed Nov. 29, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al. "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Applicances Based on Code Analysis in a Cloud Environment", U.S. Appl. No. 12/957,267, filed Nov. 30, 2010.

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud—Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

* cited by examiner

CLOUD COMPARISON REPORT — 430

Customer: Corporation A — 401

| Subscribed Service 402 | Host Cloud 404 | | | Host Cloud 405 | | | Candidate Cloud A 410 | | | Candidate Cloud B 415 | | | Candidate Cloud C 420 | | |
|---|---|---|---|---|---|---|---|---|---|---|---|---|---|---|---|
| | Instances 435 | Utilization 445 | Cost 440 | Instances 435 | Utilization 445 | Cost 440 | Instances 435 | Utilization 445 | Cost 440 | Instances 435 | Utilization 445 | Cost 440 | Instances 435 | Utilization 445 | Cost 440 |
| SVC1 Identity Management | | | | 10K | 6% | $35K | 10K | 10% | $35K | 10K | 7% | $29K | | | |
| SVC2 Messaging | 2mil | 12% | $75K | | | | | | | | | | 2mil | 25% | $40K |
| ... | | | | | | | | | | | | | | | |
| SVC3 Backup | | | | 100G | 30% | $125K | 100G | 30% | $100K | | | | 100G | 25% | $80K |
| Total Costs per Cloud — 450 | | | $75K | | | $155K | | | $135K | | | $29K | | | $120K |

| Possible Migration Options | |
|---|---|
| Cloud Combinations 470 | Notes 480 |
| Candidate Clouds A and C | Cost: $255K Extra Messaging Service Capability |
| Candidate Clouds B and C | Cost: $149K Same Service Capability |
| Candidate Clouds A and B and C | Cost: $284K Extra Identity Management Service and Backup Capabilities |

FIG. 4C

MIGRATING SUBSCRIBED SERVICES FROM A SET OF CLOUDS TO A SECOND SET OF CLOUDS

CROSS REFERENCE

This invention relates to U.S. patent application Ser. No. 12/952,897, filed Nov. 23, 2010, titled "Systems and Methods for Identifying Service Dependencies in a Cloud Deployment," and to U.S. patent application Ser. No. 12/955,277, filed Nov. 29, 2010, titled "Systems and Methods for Migrating Subscribed Services in a Cloud Deployment," which are both herein incorporated in its entirety by reference.

FIELD

This invention relates generally to services, more particularly, to systems and methods for migrating cloud computing related services from a set of host clouds to a different set of clouds.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Cloud computing environments utilize shared resources, software, and information that can be provided for use by end users. For example, a service level agreement (SLA) can be entered into between a vendor, such as an independent software vendor (ISV), and a cloud network provider whereby the cloud network provider agrees to commit an amount of resources associated with virtual machines in the cloud network for use by end users during operation of software products and applications of the vendor. In return, the cloud network provider can charge the vendor a specified rate in proportion to the amount of committed resources. The cloud network provider provides or maintains an amount of resources in the cloud network, such as server uptime, persistent storage, software application instantiation, network performance, cloud storage, support response time, and other elements.

End users or customers of the cloud network can subscribe to services offered by the cloud provider and/or other third party vendors. The customers can then use the cloud resources when operating or otherwise using the subscribed services. However, there may be instances when a customer wants to continue using the subscribed services, but wants to or needs to migrate these subscribed services to a new set of clouds, for example, due to costs. As such, it would be useful for customers to be able to compare and migrate their subscribed services from one set of clouds to another set of clouds while ensuring service compatibility, continuity, and functionality.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 4B illustrates a cloud comparison report, according to various embodiments;

FIG. 4C illustrates a Possible Migration Options Report, according to various embodiments;

DETAILED DESCRIPTION

Figure 1:
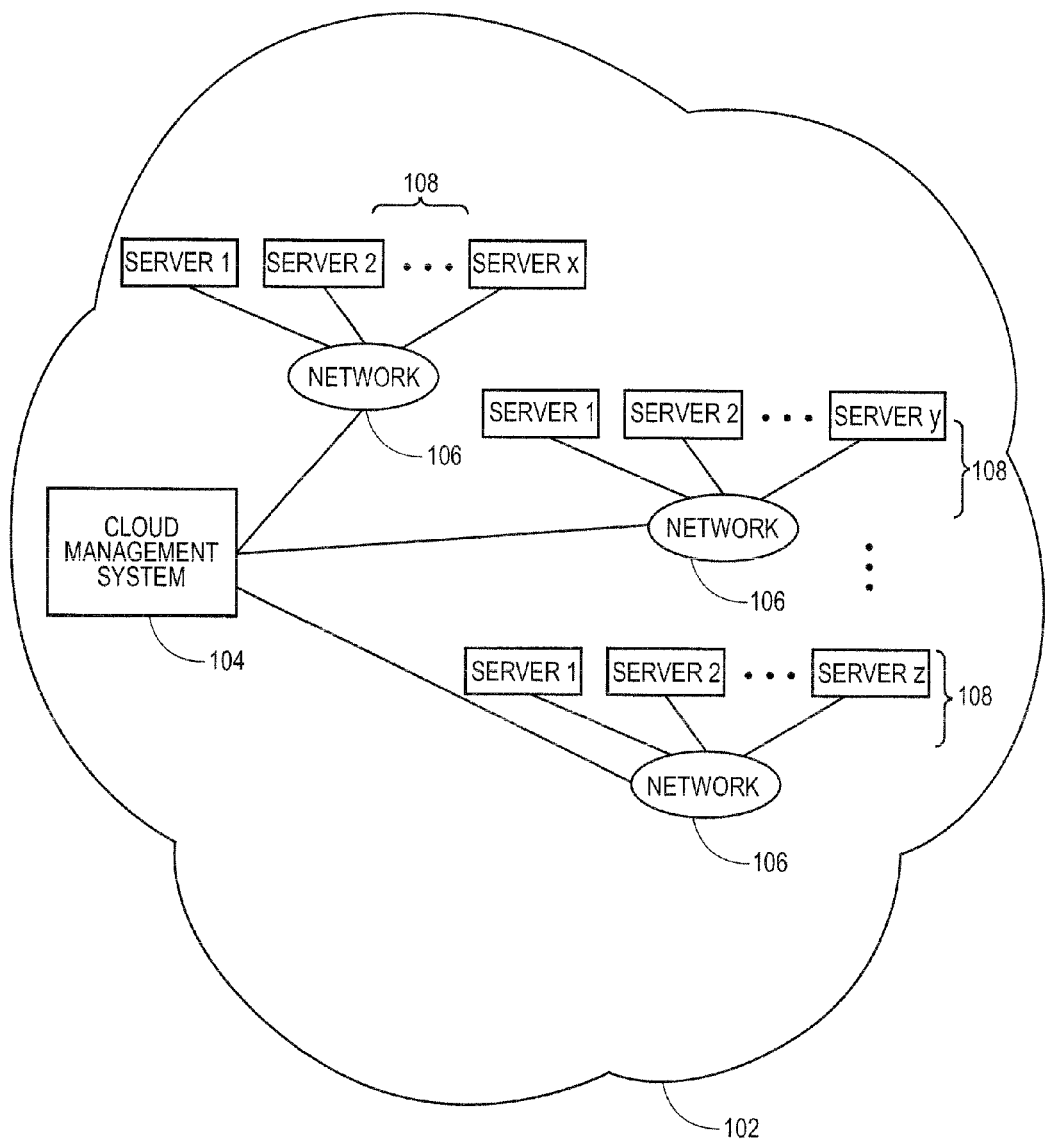
FIG. 1 illustrates an overall cloud system architecture in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for migrating subscribed services from a set of clouds to a second set of clouds. More particularly, embodiments relate to platforms and techniques in which a decision system can receive lists of subscribed to services in, for example, a set of first cloud computing environments, analyze data (e.g., usage history data) associated with the subscribed services, and provide a report of sets of candidate clouds for migrating the subscribed services to, for example, a set of second cloud computing environments. The candidate or target cloud(s) can have a specified amount of resources to be utilized by, for example, customers or end users. For example, the resources of the target cloud(s) can be deployed as Software as a Service (SaaS).

According to embodiments, a decision module or other logic can receive a list of subscribed services and a usage history associated with a set of host clouds. The decision module can detect target clouds that can be candidates in which to deploy the set of services. In additional embodiments, the set of subscribed services can be migrated to a set of the target clouds.

According to embodiments, a decision system can be configured to provide a report of candidate clouds for a set of subscribed services to a customer of a cloud computing environment. In particular, according to embodiments, the decision system can be configured to receive data related to a user's subscribed service usage history in a specific cloud computing environment, for example, subscribed services, usage of cloud resources, number and type of services instantiated, software/hardware utilized by the subscribed services, user response time, cost per user, users per instance of service, service version, and the like. Once the data is received, the decision system can be configured to compare the subscribed services from the set of host clouds with other candidate clouds based on, for example, customer criteria, (e.g., total cost for the subscribed services, utilization costs, uptime, preferred provider, location, minimum resources, language requirements, etc.). Following the comparison, the decision system can produce a report of possible migration options, for example, based on customer criteria, as discussed above. Likewise, the decision system can be configured to provide reports to the customer describing the information collected about the candidate clouds and the subscribed services. In embodiments, the user can decide to migrate the subscribed services to a selected set of candidate clouds by sending, for example, a selection of candidate clouds to the decision system.

Embodiments as described herein can be implemented in or supported by a cloud network architecture. As used herein, a "cloud" can refer to a cloud-based network comprising a collection of resources that can be invoked to instantiate a virtual machine, process, or other resource for a limited or defined duration. Cloud can also be interchanged with "cloud computing environment," "cloud environment," "cloud network," etc. In addition, as used herein, a "target cloud" can refer to any cloud available for consideration by the decision system for migration purposes. Also, a "host cloud" as used herein refers to a cloud environment that is currently being used by a customer and "target cloud" is intended to be interchangeable with "candidate cloud," etc. A set of clouds is intended to refer to more than one cloud system in which services can be instantiated.

As used herein, an "end user" can refer to a person, customer, subscriber, corporation, organization, or other entity accessing files and/or devices storing the files in the cloud. In embodiments, the end user can operate or manage computer software or hardware that can access files and/or devices storing the files in the cloud-based network. Further, as used herein, an "administrator" of a cloud can refer to a person, owner, corporation, organization, or other entity having authoritative power to initialize, oversee, or otherwise manage the operation of a cloud.

As used herein, the "resources" of a cloud can refer to software or hardware such as, for example, applications, programs, servers, device drivers, storage such as hard drives, virtual memory, databases, random access memory (RAM) and other memory, processors, multimedia cards, and the like, in the cloud. The resources can be accessed by users or by software or applications independent from or associated with resources of the cloud. In embodiments, vendors such as ISVs can supply software resources for use with other resources in a cloud. Resources of the cloud can further refer to any communications resources, such as ports or channels provided to a virtual machine or other machine or process in the cloud. Resources can likewise include services, such as Web-based services deployed in the cloud, for example security or identity management services and/or other resources.

As used herein, a "service" can be a general term that can refer to any service, operation, activity, functionality, etc., capable of being executed in, delivered through, monitored by, instantiated by, or otherwise supported by a cloud. For example, a service can be any type of identity management service, firewall or other security service, messaging service, data storage or backup service, file maintenance service, network service, language service, authorization service, information technology service, information technology support service, commerce service, business intelligence service, web hosting service, web design service, advertising service, or any other service that can be made available to an end user in the cloud environment that are developed or become available in the future. It should be appreciated that other services associated with or otherwise supported by a cloud are envisioned. Services can also be offered directly by the cloud provider and/or by a third party vendor using cloud resources. Also, service(s) can be interchanged with "subscribed service(s)," "set of service(s)," "computing processes," etc. Also, as used herein a service can be subscribed to by a customer, a cloud, a third party, etc., and generally indicates that the service has a specific duration under a license, contract, etc. The subscription can be for a fee or free.

In addition, same and/or similar services can be compared to one another across clouds. The comparison is intended to include various methods of weighting, scoring, scaling, ranking, rating, grouping, etc., that are known in the art. These various methods can be numerical, alphanumerical, graphical, statistical, etc. The comparison can also result in a list based on these various methods and can be referred to as, for example, a ranking, a rating, a grouping, etc.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
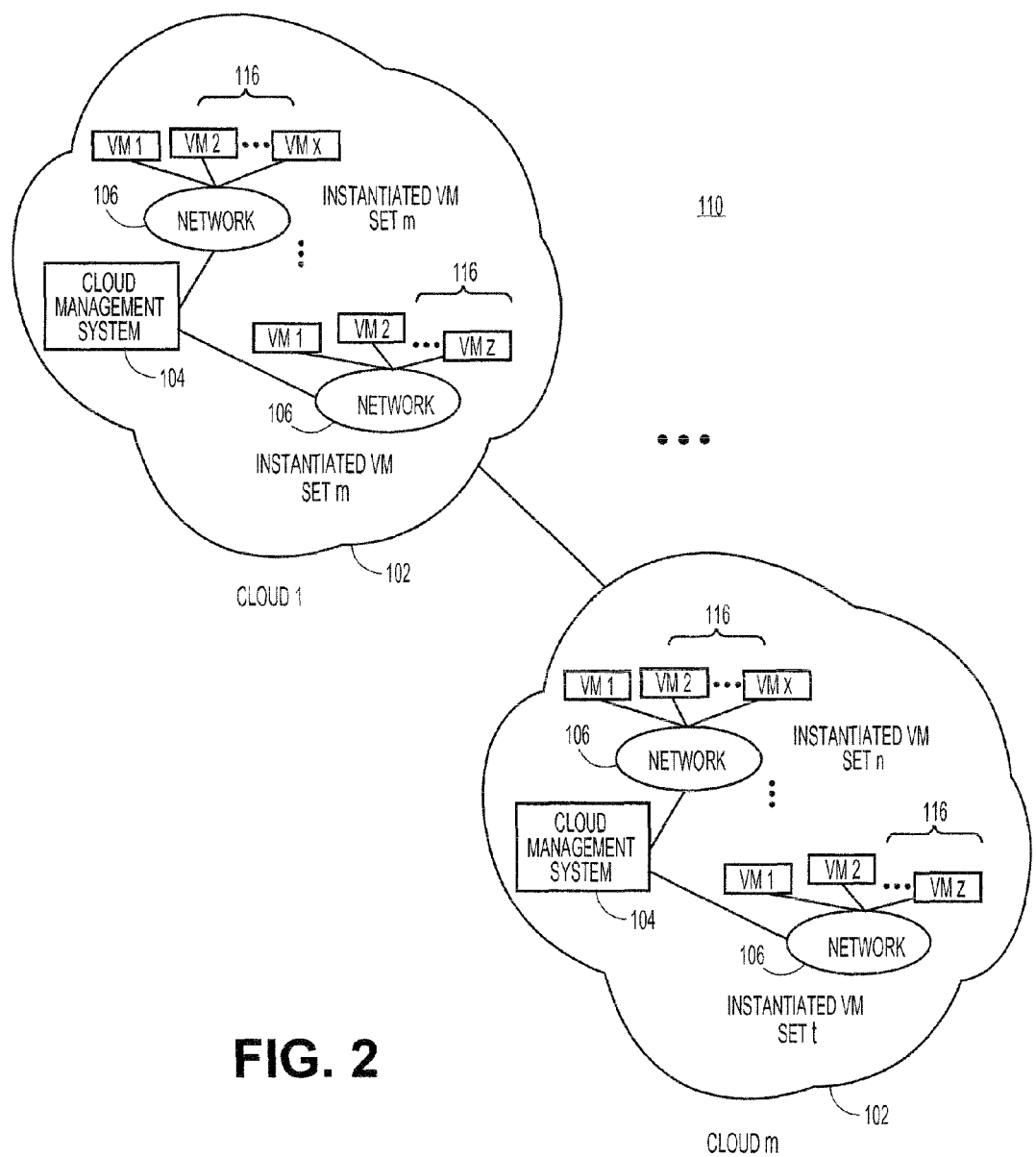
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates, and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
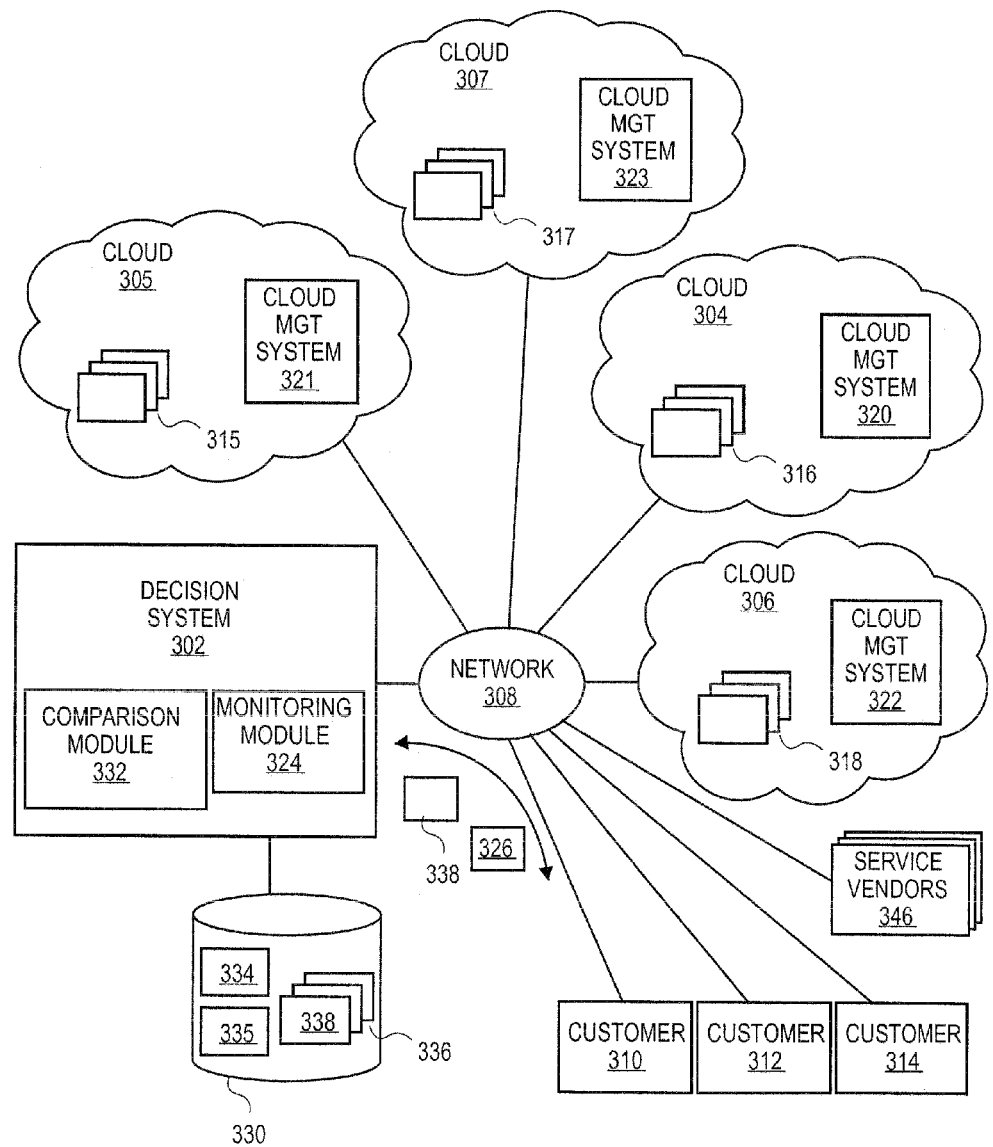
FIG. 3 illustrates an overall system in which a decision system can analyze data associated with subscribed services in a set of cloud computing environments and provide a report of candidate clouds for migration, according to various embodiments.

FIG. 3 illustrates aspects in which a decision system 302 can communicate with clouds 304-307, via one or more networks 308, according to various embodiments. While FIG. 3 illustrates various components of the decision system 302 and the clouds 304-307, one skilled in the art will realize that components can be added or removed.

In embodiments, one or more customers 310, 312, and 314 can utilize one or more of the clouds 304-307 to support subscribed services of the customers 310, 312, and 314. For example, the customer 310 can utilize the cloud 304 to support subscribed services 316 and can utilize cloud 306 to support subscribed services 318. The subscribed services 316 and 318 can be any type of service, such as, identity management services, firewall services, security services, messaging services, data storage services, backup services, file maintenance services, network services, language services, authorization services, information technology services, information technology support services, commerce services, business intelligence services, web hosting services, web design services, advertising services, etc. The customers 310, 312, and 314 can be any type of entity, such as individual users, corporations, companies, universities, and the like, that utilizes the clouds 304-307 to support subscribed services. While FIG. 3 will be described with reference to customer 310, one skilled in the art will realize that the processes and methods can be applied to any of the customers 310, 312, and 314 or any other users. Additionally, while FIG. 3 illustrates customers 310, 312, and 314, one skilled in the art will realize that methods and processes can apply to any number of users.

In embodiments, the clouds 304-307 can be any type of cloud computing environment, such as the cloud computing environments described above in FIGS. 1 and 2. As described above, the clouds 304-307 can include any number of computing systems to support the subscribed services in a cloud. The computing systems can be any type of computing systems capable of supporting subscribed services, such as servers, laptops, desktops, and the like. The computing systems can include a number of hardware resources, which are used to support the subscribed services (e.g. virtual machines, software appliances, processes and the like) in the clouds 304-307, such as processors, memory, network hardware and bandwidth, storage devices, etc. Additionally, the clouds 304-307 can include cloud management systems 320-323, respectively. The cloud management systems 320-323 can be supported by the computing resources of the clouds 304-307, respectively.

In embodiments, the cloud 304 and/or 306 can be operated and controlled by any number of entities. For example, the cloud 304 and/or the cloud 306 can be owned and/or operated by a cloud vendor, such as Amazon™, Inc., in order to provide the services of the cloud 304 and/or the cloud 306 to subscribers and customers. Likewise, for example, the cloud 304 and/or the cloud 306 can be owned and/or operated by one or more of the customers 310, 312 and 314, and the resources of the cloud 304 and/or the cloud 306 can be used by the entity, internally to support various subscribed services. As such, in either case, cloud 304 and cloud 306 can be configured to include hardware, described above, and software resources to support subscribed services. For example, if the cloud 304 and/or the cloud 306 is operated by a cloud vendor, the software resources can include operating systems, such as a distribution of Linux provided by Red Hat™ Corporation, and various software programs requested or typically desired by subscribers, such as middleware applications, web hosting applications, electronic mail (email) applications, and the like. Likewise, for example, if the cloud 304 and/or the cloud 306 is operated by an entity for internal use, the software resources can include software resources required to support the specific internal uses. For instance, the cloud can be utilized by a corporation to perform simulations on a product and the software resources can include operating systems and application programs to run the simulations.

In embodiments, the one or more networks 308 can be or include the Internet, or other public or private networks. The one or more networks 308 can be or include wired, wireless, optical, and other network connections. One skilled in the art will realize that the one or more networks 308 can be any type of network, utilizing any type of communication protocol to connect the computing systems.

In embodiments, due to the dynamics of the subscribed services 316 and 318, the customer 310 can desire to actively monitor the subscribed services 316 and 318. For instance, the customer 310 can desire to monitor the subscribed services 316 and 318 to ensure that the appropriate subscribed services are running and functioning properly. Likewise, the customer 310 can desire to monitor the subscribed services 316 and 318 to determine the usage of the resources of the clouds 304, 306 for billing and other purposes.

In embodiments, the decision system 302 can be configured to monitor the clouds 304-307 for the one or more customers 310, 312, and 314. In particular, the decision system 302 can be configured to monitor the computing process associated with the customers 310, 312, and 314 and supported by the clouds 304-307. The decision system 302 can be configured to subscribe the customers 310, 312, and 314 to the monitoring services provided by the decision system 302. Once subscribed, the decision system 302 can be configured to receive access information from the customers 310, 312, and 314. The decision system 302 can be configured to utilize the access information to access and communicate with the clouds 304-307 in order to monitor the subscribed services 315-318 supported by the clouds 304-307 and to collect information about the subscribed services 315-318. Additionally, the decision system 302 can be configured to report any information collected while monitoring the customers 310, 312, and 314.

In embodiments, the decision system 302 can be operated by an entity that provides the monitoring services to the customers 310, 312, and 314. The monitoring services can be provided to the customers 310, 312, and 314 for a fee. The decision system 302 can be supported by one or more computing systems, such as servers, laptops, desktops, and the like. The decision system 302 can include conventional components of a computing system, such as such as processors, memory, network interfaces, storage devices, etc.

In embodiments, to monitor the subscribed services 315-318, the decision system 302 can be configured to include a monitoring module 324. The monitoring module 324 can be configured to cooperate and communicate with the customers 310, 312, and 314 to subscribe the customers 310, 312, and 314 to the monitoring services and to report any gathered information to the customers 310, 312, and 314. The monitoring module 324 can be configured to monitor one or more aspects of the running processes based on one or more predefined parameters or a set of parameters defined by the customer 310. The parameters can include, for example, types of subscribed services, subscribed service functionalities, users per instance of a subscribed service, maximum users per instance of a subscribed service, cost per user, fail-overs, downtime, response times, etc. Likewise, the monitoring module 324 can be configured to cooperate and communicate with the clouds 304-307 to monitor subscribed services 315-318 supported by the clouds 304-307. The monitoring module 324 can be implemented as a software program that is configured to execute on the decision system 302. Likewise, the monitoring module 324 can be implemented as a portion of other software programs configured to execute on the decision system 302. In either case, the monitoring module 324 can be configured to include the necessary logic, commands, instructions, and protocols to perform the processes described below. In any implementation, the monitoring module 324 can be written in any type of conventional programming language such as C, C++, JAVA, Perl, and the like. Additionally, the monitoring module 324 can be stored in computer readable storage devices or media (CD, DVD, hard drive, portable storage memory, etc.) whether local to the decision system 302 or remotely located.

In embodiments, once the customer 310 has subscribed, the monitoring module 324 can be configured to generate and maintain a set 336 of usage history data 338. Each usage history data 338 in the set 336 can be configured to store an identification of the running processes, such as subscribed services 315-318, the customer associated with the running processes, and any information collected during the monitoring of the subscribed services 315-318. The monitoring module 324 can maintain the set 336 of usage history data 338 in a repository 330, such as a database. The repository 330 can be stored in computer readable storage devices or media (CD, DVD, hard drive, portable storage memory, etc.) whether local to the decision system 302 or remotely located.

In embodiments, once the customer 310 is subscribed, the monitoring module 324 can be configured to communicate with the clouds 304-307 to monitor the subscribed services 315-318. For example, the monitoring module 324 can be configured to retrieve the usage history data 338 associated with the customer 310 and/or the subscribed services 315-318 associated with the customer 310. To retrieve the utilization data 338, the monitoring module 324 can be configured to include the necessary logic, commands, instructions, and protocols to search the set 336 of usage history data 338 and to retrieve the usage history data 338 and the access information for the customer 310. For instance, the monitoring module 324 can be configured to include the necessary queries and commands to communicate with and retrieve information from the repository 330.

The monitoring module 324 can be configured to monitor the subscribed services 315-318 and collect information such as usage history of cloud subscribed services 315-318, details of the subscribed services 315-318, and the like. For example, for usage history of the cloud subscribed services 315-318, the monitoring module 324 can be configured to collect information, such as type of subscribed services 315-318, (e.g., identity management services, firewall services, security services, messaging services, data storage services, backup services, file maintenance services, network services, language services, authorization services, information technology services, information technology support services, commerce services, business intelligence services, web hosting services, web design services, advertising services, etc.), costs per user, response times, fail-overs, downtime, instances per user, the number of application resources used in the clouds 304-307, the duration software resources are utilized, current fees for using the clouds 304-307, etc.

In embodiments, in order to monitor and collect information about the subscribed services 315-318, the monitoring module 324 can be configured to communicate with the cloud management systems 320-323 of the clouds 304-307, respectively. For example, the monitoring module 324 can be configured to communicate with the cloud management systems 320-323 in order to collect information about the usage of the clouds 304-307. Likewise, the monitoring module 324 can be configured to communicate with the subscribed services 315-318 to collect information about the details of the subscribed services 315-318. For example, the monitoring module 324 can be configured to communicate with virtual machine monitors supporting virtual machines, with the virtual machines directly, with software appliances, with the software programs, and the like.

In embodiments, the monitoring module 324 can statically or dynamically analyze program data, code, and/or executable files associated with the host cloud to determine information related to the subscribed services. In further embodiments, the monitoring module 324 can statically or dynamically analyze any meta-data or services available specifically to applications in the host cloud to determine information related to the services. It should be appreciated that other techniques used to determine services of the host cloud are envisioned.

In embodiments, to communicate with the clouds 304-307, the monitoring module 324 can be configured to establish a connection with the cloud 304-307 via the network 308. In particular, the monitoring module 324 can be configured to establish a connection with the cloud management systems 320-323 and/or a connection to the subscribed services 315-318. To achieve this, the monitoring module 324 can be configured to include the necessary logic, instructions, commands, and protocols to communicate with the cloud management systems 320-323 and/or a connection to the subscribed services 315-318 via network 308. For example, the monitoring module 324 can be configured to establish a connection using network protocols, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol.

In embodiments, the monitoring module 324 can be configured to monitor the subscribed services 315-318 periodically for a specified duration and/or upon the occurrence of any events. For example, the monitoring module 324 can be configured to monitor the subscribed services 315-318 upon the subscription of the customer 310 and periodically (every hour, once a day, etc.) while the customer 310 is subscribed.

In embodiments, once information about the subscribed services 315-318 is collected, the monitoring module 324 can be configured to store the collected information in the usage history data 338 associated with the customer 310. As such, the monitoring module 324 can be configured to classify the collected information and store the information in the usage history data 338. To achieve this, the monitoring module 324 can be configured to include the necessary logic, commands, instructions, and protocols to sort and classify the collected information and store the sorted and classified information in the usage history data 338.

In embodiments, when the information is collected, the decision system 302 can be configured to generate reports to provide the collected information to the customer 310. The decision system 302 can be configured to generate the report in any format to display the collected information to the customer 310. To achieve this, the decision system 302 can include the necessary logic, commands, instructions, and protocols to retrieve the collected information from the usage history data record 338 and organize the collected information into the reports.

In embodiments, the decision system 302 can be configured to generate and provide the reports to the customer upon the occurrence of any number of events. For example, the decision system 302 can be configured to provide the reports upon request of the customer 310 and/or periodically. The decision system 302 can be configured to receive the request for the reports via an interface 326. Likewise, the decision system 302 can be configured to provide the reports via the interface 326. Additionally, the decision system 302 can provide the reports to the customer 310 via the network 308 utilizing any type of network protocol, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol.

In embodiments, to generate or produce reports of candidate clouds, the decision system 302 can be configured to include a comparison module 332. The comparison module 332 can be implemented as a software program that is configured to execute on the decision system 302. Likewise, the comparison module 332 can be implemented as a portion of other software programs, such as monitoring module 324, configured to execute on the decision system 302. In either case, the comparison module 332 can be configured to include the necessary logic, commands, instructions, and protocols to perform the processes described below. In any implementation, the comparison module 332 can be written in any type of conventional programming language such as C, C++, JAVA, Perl, and the like. Additionally, the comparison module 332 can be stored in computer readable storage devices or media (CD, DVD, hard drive, portable storage memory, etc.) whether local to the decision system 302 or remotely located.

In embodiments, the comparison module 332 can be configured to generate and to maintain a set of subscribed services' resource rules 334. The set of subscribed services' resource rules 334 can be configured to store rules or best practices for deploying subscribed services in computing cloud environment such as the clouds 304-307. The set of subscribed services' resource rules 334 can be configured to include requirements for subscribed services provided by the owners and operators of the clouds 304-307. The set of subscribed services' rules 334 can also be configured to include resources available in the clouds 304-307. Likewise, the set of subscribed services' resource rules 334 can be configured to include requirements or preferences for subscribed services provided by service vendors 346, which can be service vendors independent of the decision system 302 and the clouds 304-307, such as independent software vendors (ISVs).

In embodiments, the set of subscribed services' resource rules 334 can be configured in any format and can include any information that provides the necessary logic, such as algorithms and/or heuristics, for generating ranked candidate cloud options based on the information collected during the monitoring of the subscribed services 315-318. For example, the set of subscribed services' rules 334 can include any number of rules based on the costs of running subscribed services 315-318. For instance, a rule can specify that utilization costs should be minimized. Rules can relate to costs, downtime, fail-overs, etc., and can be customized based on a customer's history usage data and specific customer requirements. The comparison module 332 can be configured to store the set of subscribed services resource rules 334 in the repository 330.

While FIG. 3 shows the decision system 302 as maintaining a set of subscribed services resource rules 334, one skilled in the art will realize that the decision system 302 can maintain multiple sets of subscribed services resource rules. Additionally, while FIG. 3 describes the decision system 302 accessing the set of subscribed services resource rules 334, one skilled in the art will realize that the decision system 302 can be configured to allow other systems to access the set of subscribed services resource rules 334, for example, by providing an API to the set of subscribed services resource rules 334.

Various data definitions for defining the format of data generated and received by the decision system 302 can be utilized. For example, a data definition in the form of document type definition can be used and one skilled in the art will realize that the any type of data definitions can used. The data definitions can include metadata for data utilized by the decision system 302 to generate ranked candidate clouds, such as, a requester identifier (e.g., customer id), and data parameters such as currently subscribed services (e.g., identity management services, firewall services, security services, messaging services, data storage services, backup services, file maintenance services, network services, language services, authorization services, information technology services, information technology support services, commerce services, business intelligence services, web hosting services, web design services, advertising services), configuration of currently subscribed services (e.g., type of service, instances of service, cloud utilization, cost for utilization, cost per service, total cost for subscribed services, downtime, fail-overs, response time, and the like). Similarly, various data sets can be generated by the decision system 302 in accordance to the data definitions used. For example, a data set can include data utilized by the decision system 302 to generate a ranked list of candidate clouds, such as the service, customer, and data parameters.

In some embodiments, the decision module 302 can simulate, model, or otherwise analyze the usage history data with respect to resources within target clouds and other clouds, such as on the set of instantiated virtual machines. In other embodiments, the decision module 302 can determine the capacity within a target cloud and other clouds to initialize, execute, or otherwise support any of the services in the usage history data. For example, the decision module 302 can detect that usage history data comprises data related to a messaging service, and can determine that resources in the target cloud have an infrastructure in place to support the messaging service.

In embodiments, the decision module 302 can determine that the target clouds have an ability to support a type of service, but may or may not have a capacity to support the service with a similar amount of processing power, network bandwidth, end users, or other metrics as indicated in the history usage data. For example, the history usage data can specify that, on average, 2,000 end users access a firewall service every day, but the decision module 302 can determine that the resources of the target clouds can only support, on average, 1,000 end users accessing a similar firewall service every day. For further example, the usage history data can specify that, on average, end users utilize 100 GB of storage per month in operating a data storage service, and the decision module 302 can determine that the resources of the target clouds can support, on average, end users utilizing 150 GB of storage per month in operating a similar firewall service.

Figure 4A:
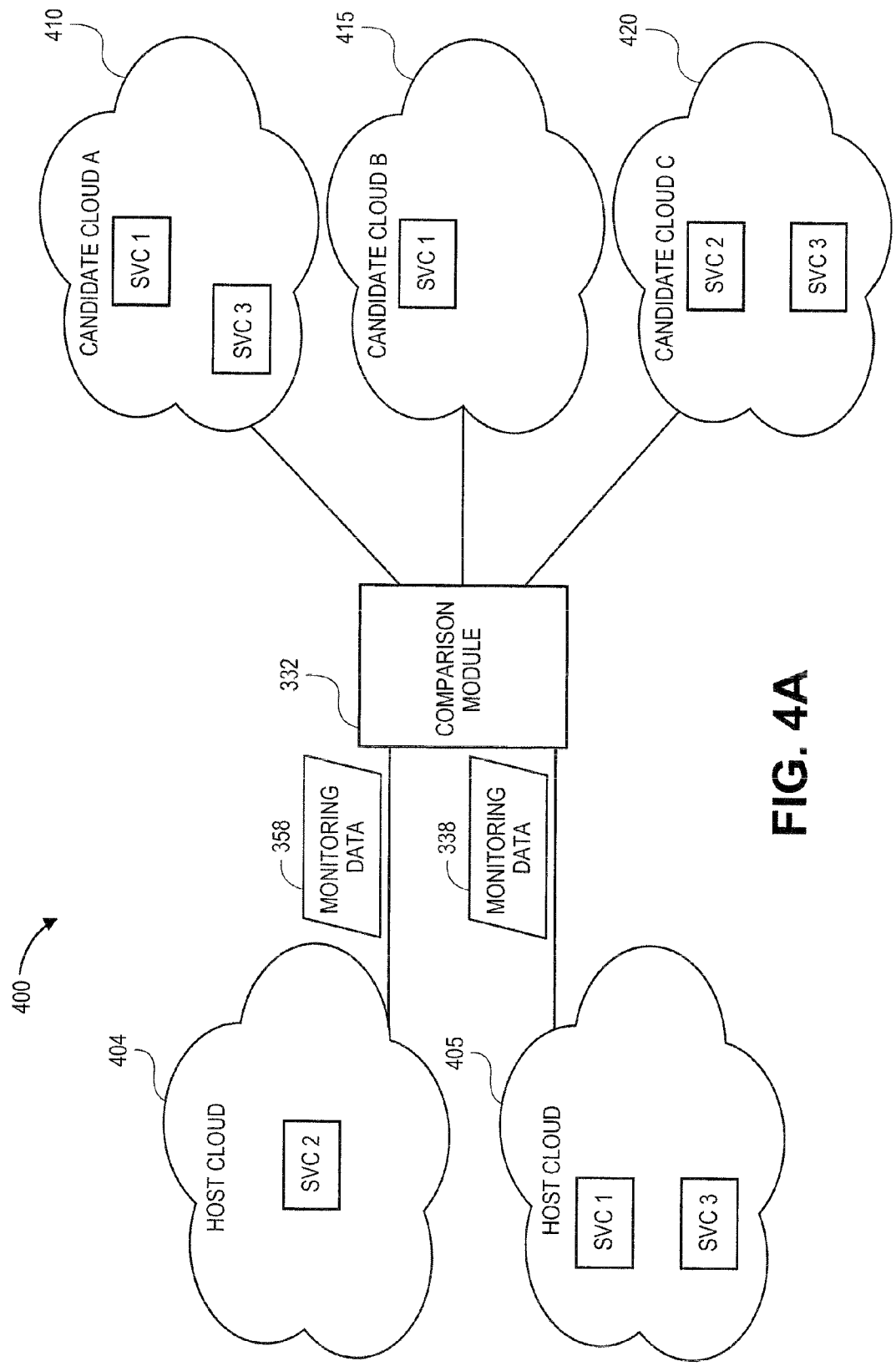
FIG. 4A illustrates an exemplary embodiment of a cloud system in which a set of host clouds are compared to a set of candidate clouds, according to various embodiments.

In embodiments, the decision system 302 can be configured to provide a cloud comparison report 430 to advise the customer of the comparison of the set of host clouds with other candidate clouds, as shown in FIGS. 4A-4B. FIG. 4C is an additional example of a possible migration options report 460. It should be recognized that the reports 430 and 460 illustrate examples and that values, variable, and arrangements as shown in FIGS. 4A-4C are for illustration purposes and can be changed and/or added to as required.

FIG. 4A is an exemplary configuration 400 depicting a potential migration or deployment of services. It should be appreciated that the values, variables, and arrangements as shown in FIG. 4A are for illustration purposes and can be any value, variable, and arrangement. The configuration 400 comprises a set of host clouds 404-405, the comparison module 332, and three target clouds, namely, candidate cloud A 410, candidate cloud B 415, and candidate cloud C 420. As shown in FIG. 4A, the set of host clouds 404-405 can support the operation of three services, namely, SVC 1, SVC 2, and SVC 3. The comparison module 332 can be configured to receive monitoring data 338 comprising end user data, for example, regarding utilization of the services within the set of host clouds 404-405, along with services information for the candidate clouds A-C 410, 415, and 420.

In embodiments, each of the candidate clouds 410, 415, and 420 can have the capacity to support one or more services. For example, as shown in FIG. 4A, candidate cloud A 410 has the capacity to support SVC 1 and SVC 3, candidate cloud B 415 has the capacity to support SVC 1, and candidate cloud C 420 has the capacity to support SVC 2 and SVC 3. The comparison module 332 can determine which candidate clouds (e.g., combination of candidate clouds) have the configuration, ability, capacity, etc., to support the services of the host clouds 404-405. For example, candidate cloud A 410 in combination with candidate cloud C 420 has the capacity to support each of SVC 1, SVC 2, and SVC 3. For further example, candidate cloud A 410 in combination with candidate cloud B 415 does not have the capacity to support each of SVC 1, SVC 2, and SVC 3 because neither candidate cloud A 410 nor candidate cloud B 415 has the capacity to support SVC 2.

In embodiments, the comparison module 332 can examine the monitoring data 338 from the host clouds 404-405 in combination with the respective capabilities of the candidate clouds 410, 415, and 420 to determine which combination(s) of candidate clouds can support a deployment of the services of the host clouds 404-405. It should be appreciated that as discussed above, the comparison module 332 or other logic can employ any calculations, simulations, or models to examine/compare the capabilities of any of the candidate clouds 410, 415, and 420. The comparison module 332 can produce a cloud comparison report 430 and a possible migration options report 460 as shown in FIGS. 4B-C.

A cloud comparison report 430 is illustrated in FIG. 4B. As shown in FIG. 4B, a customer or company identifier 401 can be used to identify who the report 430 is about. In the illustrated example, the monitoring module 324 of the decision system 302 has monitored Corporation A 401, in host clouds 404-405. The duration of the monitoring can be selected by the customer 401 (e.g., Corporation A) or be set as a default, (e.g., 24 hours, one week, etc.). The parameters monitored can include, but are not limited to, subscribed service 402, instances of the subscribed service 435, cloud utilization 445 by the instances of the subscribed service, and the cost for the utilization 440 associated with the instances of the subscribed service. In FIG. 4B, the duration is set at a day or 24 hours (not shown). As shown, various subscribed services 402 are listed, including an identity management service SVC 1 (e.g., from Oracle® or IBM®, etc.), a messaging service SVC 2 (e.g., from Oracle®, Microsoft®, etc.), and a backup service SVC 3 (SOS Backup, IBackup, etc.). Other examples of types of subscribed services that can be compared can include, identity management services, firewall services, security services, messaging services, data storage services, backup services, file maintenance services, network services, language services, authorization services, information technology services, information technology support services, commerce services, business intelligence services, web hosting services, web design services, advertising services, and the like. As is known in the art, various vendors (ISVs) can supply such services, e.g., Red Hat, Microsoft, Apple, IBM, Oracle, and the like.

An example of the usage history data collected by the monitoring module 324 is shown under host clouds 404-405. The information includes, but is not limited to, instances of the service 435 (in 24 hours), cloud utilization 445, and cost for utilization 440. It is noted that for the backup service, the instances 435 are listed as the amount of data backed up. Other information can include, for example, cost per instance, total cost for the subscribed services, cost per instance, response time (user, network, etc.), fail-over rate, downtime, and the like. The example data includes each subscribed service 402 monitored at the host clouds 404-405 and corresponding data for each candidate cloud (e.g., candidate cloud A 410, candidate cloud B 415, and candidate cloud C 420). For example, the identity management service at the host cloud 405 has service instances 435 (e.g., certificate issuance, encryption, etc.) of ten thousand a day, which corresponded to a cloud utilization 445 of six percent a day, for a cost of thirty thousand dollars a day. In comparison, candidate cloud A's 410 utilization 445 is ten percent with a cost 440 of thirty five thousand dollars a day, while candidate cloud B's 415 utilization 445 is seven percent at a cost 440 of twenty nine thousand dollars. Similarly, the messaging service at host cloud 404 has two million instances 435 (e.g., email messages, instant messaging sessions, etc.) a day for a utilization 445 of twelve percent and a cost 440 of seventy five thousand dollars. In comparison, two million instances 435 at candidate cloud C 420 corresponds to a utilization 445 of nine percent and a cost 440 of thirty three thousand.

The final subscribed service 402 shown in FIG. 4B is a backup service. In this example the instances 435 correspond to the amount of data stored over a 24 hour period. For example, one hundred gigabytes of data were stored by the host cloud 405. In the host cloud 405 this storage corresponded to twenty percent of the cloud's utilization 445 at a cost 440 of one hundred twenty five thousand dollars. In comparison, in candidate cloud A 410 the same storage 435 would correspond to thirty percent utilization 445 at a cost 440 of one hundred thousand dollars, while in candidate cloud C 420, the same storage 435 corresponds to a utilization 443 of twenty five percent at a cost 440 of eighty thousand dollars.

Finally, at the end of the report 430, a total cost per cloud 450 can be presented. In the example shown in FIG. 4B, the total cost 450 for the host cloud 404 is seventy five thousand dollars and the total cost 450 for host cloud 405 is one hundred fifty five thousand dollars. In comparison, the total cost 450 for candidate cloud A 410 is one hundred thirty five thousand dollars, the total cost 450 for candidate cloud B 415 is twenty nine thousand dollars, and the total cost 450 for candidate cloud C 420 is one hundred twenty thousand dollars. As an output, the decision system 302 can send report 430 to the customer and/or send a report 460 including possible migration options of candidate clouds to which the subscribed services can be migrated. Alternatively, report 430 and report 460 can be combined.

FIG. 4C shows example possible migration options produced in a report 460 format. The report 460 can have various formats based on the customer's preference. In FIG. 4C, report 460 has two columns, cloud combinations 470 and Notes 480. Under cloud combinations 470, three candidate cloud combinations are provided. The first candidate cloud combination includes candidate clouds A 410 and C 420. The notes indicate that this candidate cloud combination could support the subscribed services 402 of host clouds 404-405 for a cost of two hundred fifty five thousand dollars, but would include additional messaging service SVC 2 capability (e.g., capacity, etc.). In comparison, the second candidate cloud combination that could support the subscribed services 402 of the host clouds 404-405 includes candidate clouds B 415 and C 420. In the corresponding notes column, the same services as used in hosts clouds 404-405 could cost one hundred forty nine thousand dollars. Finally, the third candidate cloud combination includes candidate clouds A 410, B 415, and C 420 at a cost of two hundred eighty four thousand dollars and would include additional identity management SVC 1 and backup SVC 3 services capabilities.

The possible migration options report 460 can be determined by comparison module 332 based in part on subscribed services resource rules 334. In addition, the user can add requirements as desired to the subscribed services resource rules 334. For example, in FIG. 4C, the report 460 can be based on a comparison of the total costs per cloud ranked in order of cost from least expensive to most expensive (not shown). It will of course be obvious to one of skill in the art that many different parameters can be used to rank the list of possible migration options 460 based on a customer's desires or system requirements.

As will also be understood, one ranked report 460 will typically be supplied to a customer, however, in certain situations, multiple recommendations can also be supplied. For example, if a customer supplies the comparison module 332 with multiple possible requirements that could conflict with each other, such as minimizing the cost per service as compared to requiring a minimum number of instances of a service. As will be obvious, the report 460 can be tailored for a migration from the set of host clouds to another set of clouds.

Figure 5:
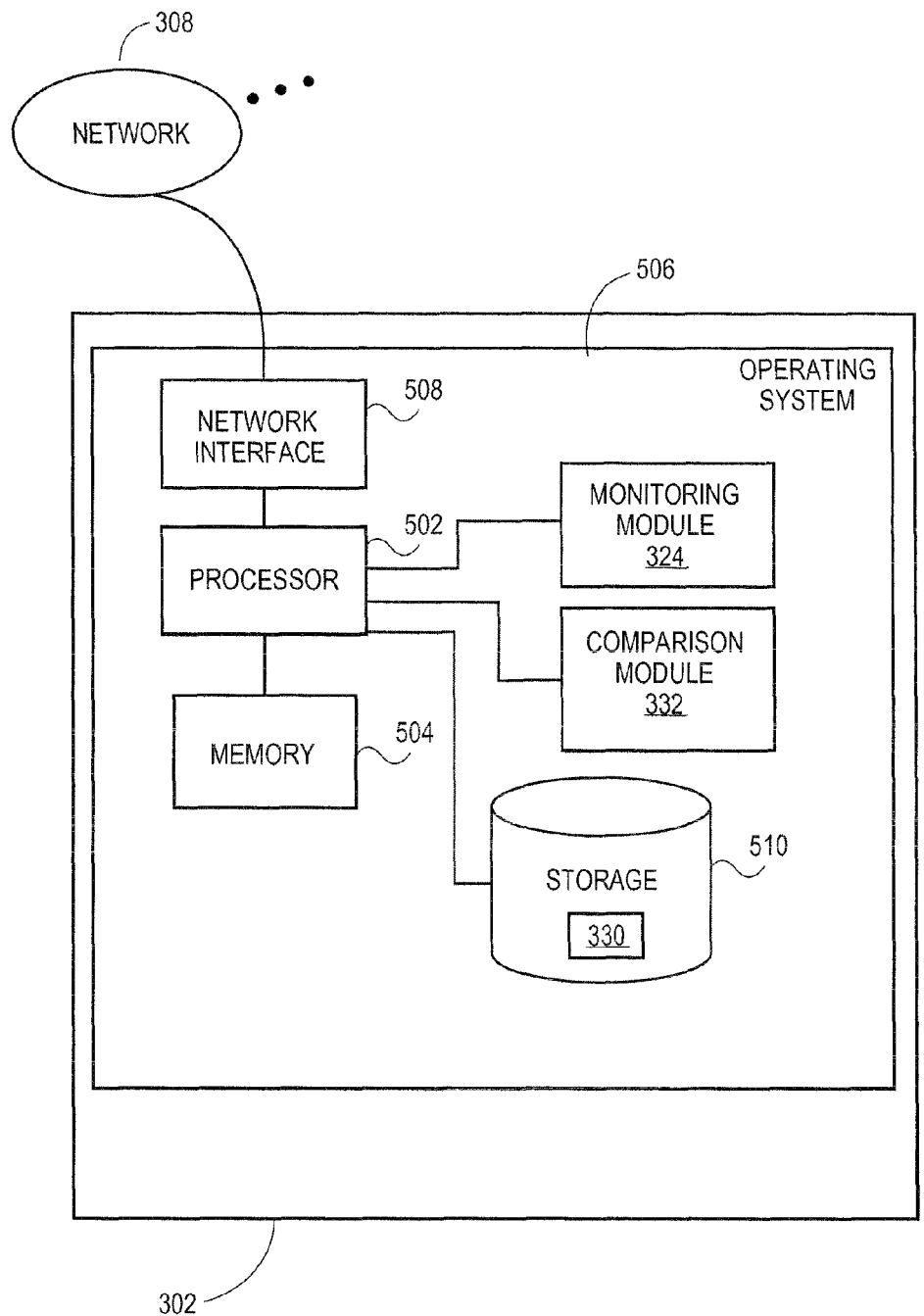
FIG. 5 illustrates an exemplary hardware configuration for a decision system, according to various embodiments.

FIG. 5 illustrates an exemplary diagram of hardware and other resources that can be incorporated in the decision system 302, which can implement the monitoring module 324 and the comparison module 332, and configured to communicate with the clouds 304-307 via one or more networks 308, according to embodiments. In embodiments as shown, the decision system 302 can comprise a processor 502 communicating with memory 504, such as electronic random access memory, operating under control of or in conjunction with operating system 506. Operating system 506 can be, for example, a distribution of the Linux™ operating system, such as SELinux, the Unix™ operating system, or other opensource or proprietary operating system or platform. Processor 502 can also communicate with one or more computer readable storage mediums 510, such as hard drives, optical storage, and the like, which can store the repository 330. Processor 502 can further communicate with network interface 508, such as an Ethernet or wireless data connection, which can in turn communicate with one or more networks 308, such as the Internet or other public or private networks.

Processor 502 can also communicate with the monitoring module 324 and the comparison module 332 to execute control logic and allow for monitoring subscribed services as described above and below. Other configurations of the decision system 302, associated network connections, and other hardware and software resources are possible.

While FIG. 5 illustrates the decision system 302 as a standalone system including a combination of hardware and software, the decision system 302 can include multiple systems operating in cooperation. The monitoring module 324 and the comparison module 332 can be implemented as a software application or program capable of being executed by the decision system 302, as illustrated, or other conventional computer platforms. Likewise, the monitoring module 324 and the comparison module 332 can also be implemented as a software module or program module capable of being incorporated in other software applications and programs. In either case, the monitoring module 324 and the comparison module 332 can be implemented in any type of conventional proprietary or open-source computer language. When implemented as a software application or program code, the monitoring module 324 and the comparison module 332 can be stored in a computer readable storage medium, such as storage 510 accessible by the decision system 302. Likewise, during execution, a copy of the monitoring module 324 and the comparison module 332 can be stored in the memory 504.

Figure 6:
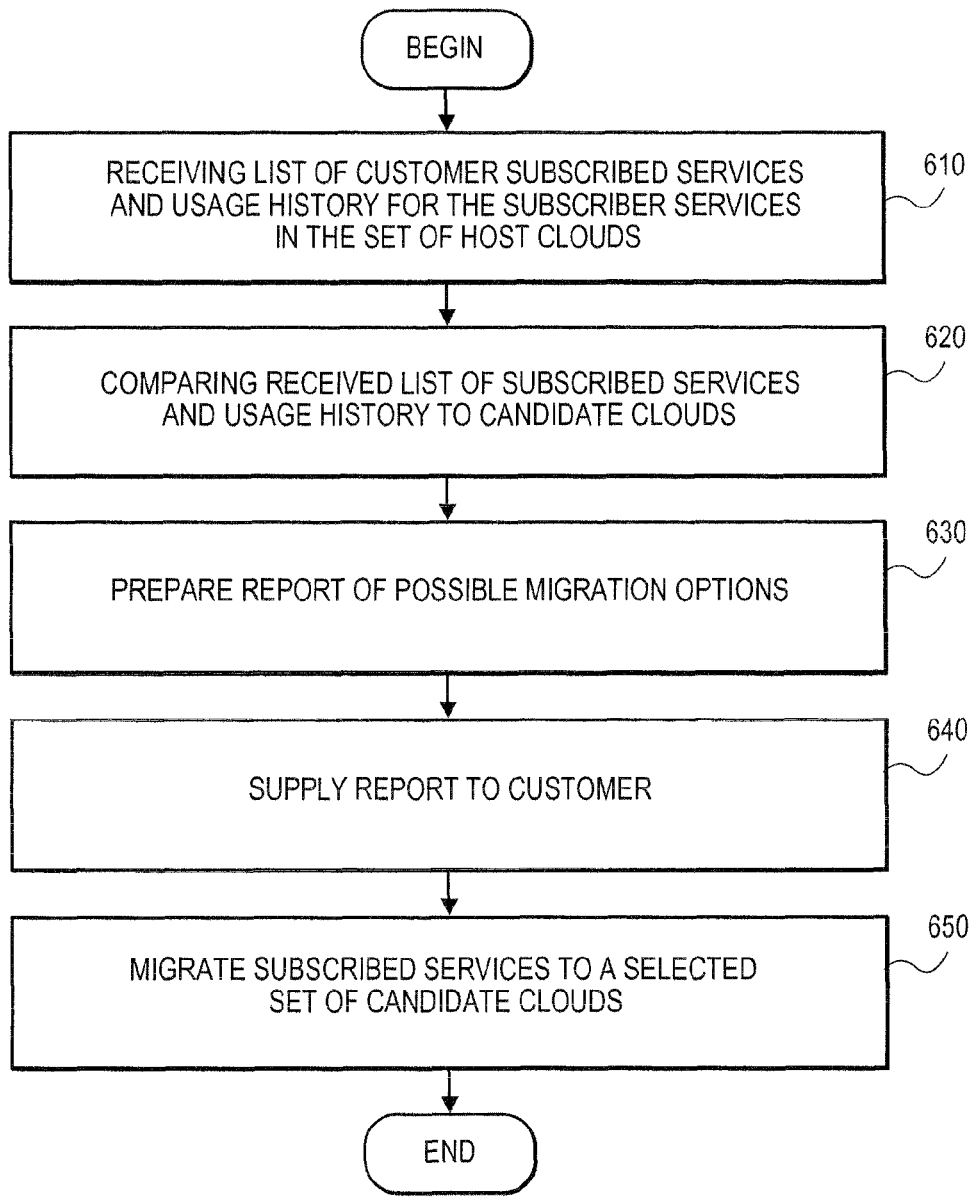
FIG. 6 illustrates a flowchart of an exemplary process for migrating subscribed services from one set of cloud computing environments to a second set of cloud computing environments, according to various embodiments.

FIG. 6 illustrates a flowchart of an exemplary process for generating one or more reports of possible migration options of candidate clouds, according to embodiments. In the exemplary process, a decision system (e.g., decision system 302 as shown in FIG. 3) can be configured to provide comparison information between a set of host clouds and candidate clouds (e.g., clouds 304 and/or 305, and/or 306, and/or 307), and a set of candidate clouds for migration of a set of subscribed services of customers (e.g., customer 310, 312, and/or 314). As processing begins, the decision system in 610 can receive a list of customer subscribed services and usage history data for the subscribed services in a set of host clouds (e.g., usage history data 338) by, for example, monitoring module 324. In embodiments, the usage history data can be used to dynamically determine a set of parameters based on a configuration of the subscribed services that the customer is associated with and/or based on user requirements, etc. The decision system can also retrieve default or predefined sets of parameters (e.g., data definitions discussed above) from a computer readable storage medium. For example, the decision system can retrieve predefined parameters from a repository (e.g., repository 330) or communicate with cloud management systems (e.g., cloud management systems 320, 321, 322, and/or 323), service vendors (e.g., service vendors 346), or other sources (e.g., the Internet) to retrieve predefined parameters. The parameters can include, for example, a configuration of a current subscribed service (e.g., instances, cost per instance, etc.), a time duration, response time, a network traffic level, a storage utilization, software license information, and the like. One skilled in the art will realize that the other parameters or types of parameters can be used.

While not shown in 610, the decision system can monitor the subscribed services as they run in a current or previous deployment in a set of cloud computing environments. The decision system receives this monitoring data, including the duration of time and can store it in a repository.

In 620, the decision system can compare the received list of subscribed services and usage history to candidate clouds. For example, the decision system can retrieve rules, algorithms, and/or heuristics for generating a comparison report based on the received usage history and any addition requirements. The decision system can retrieve the rules from a computer readable storage medium (e.g., application resource rules set 334 in repository 330). The decision system can also determine and/or estimate corresponding parameters for candidate clouds to us in the comparison.

In step 630, a report of possible migration options can be prepared. The report can be based on customer criteria and/or subscribed services resource rules. For example, the rules can include ranking the candidate clouds in order of overall costs, costs per subscribed service, utilization costs, etc. In step 640 the report of possible migration options can be supplied to the customer. Additionally or alternatively the comparison performed in step 620 can be supplied to the customer, for example, in a report form, as well. Finally in step 650 the subscribed services from the set of host clouds can be migrated to a selected set of candidate clouds. The selected set of candidate clouds can be selected by the customer or can be a default selection, e.g., the top ranked set of candidate clouds. The process can end after 650, but the process can return to any point and repeat and/or the process can receive a decision from the customer to apply/instantiate the supplied rankings. As would be understood, additional steps, while not shown, can be added and/or performed at various points during the process shown in FIG. 6. Also the process illustrated can stop at various steps, for example, step 620 or step 630 without having to complete steps 640 and/or 650.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the aspects have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   receiving data representing a list of a plurality of subscribed services of a customer and corresponding usage histories from a first set of clouds;
   determining a plurality of candidate cloud environments in view of the list of the plurality of subscribed services of the customer;
   comparing, by a processing device, the first set of clouds to the plurality of candidate cloud environments in view of the list of the plurality of subscribed services of the customer and the corresponding usage histories to generate a plurality of possible migration options for the plurality of candidate cloud environments;
   receiving a set of candidate cloud environments selected from the plurality of possible migration options for the plurality of cloud environments; and
   migrating the plurality of subscribed services of the customer to the set of candidate cloud environments.

2. The method of claim 1, further comprising:
   producing a report of possible migration options for the plurality of candidate cloud environments in view of the comparison.

3. The method of claim 2, wherein producing the report of the possible migration options for the plurality of candidate cloud environments in view of the comparison, further comprises:
   receiving a list of customer criteria; and
   ranking the plurality of candidate cloud environments in view of the list of customer criteria.

4. The method of claim 2, further comprising:
   supplying the report of the possible migration options for the plurality of candidate cloud environments to the customer.

5. The method of claim 4, further comprising:
   determining a second set of clouds from the plurality of candidate cloud environments in view of a result of the comparing.

6. The method of claim 5, further comprising:
   migrating the plurality of subscribed services of the customer from the first set of clouds to the second set of clouds.

7. The method of claim 1, wherein the subscribed services comprise at least one of, identity management services, firewall services, security services, messaging services, data storage services, backup services, file maintenance services, network services, language services, authorization services, information technology services, information technology support services, commerce services, business intelligence services, web hosting services, web design services, or advertising services.

8. The method of claim 1, wherein the corresponding usage histories comprise:
   at least one of, instances of the subscribed service, cloud utilization, cost per instance of subscribed service, cost per total instances of subscribed service, duration of instances, cost of cloud utilization, or total cost for subscribed services.

9. The method of claim 1, wherein comparing the first set of cloud computing environments to the plurality of candidate cloud environments in view of the usage histories comprises:
   comparing cloud utilization and cost of cloud utilization between the first set of cloud computing environments and the plurality of candidate cloud environments.

10. A system comprising:
    at least one memory;
    a hardware interface to a set of resources in multiple cloud computing environments; and
    a processing device to communicate with the set of resources in the multiple cloud computing environments via the interface, the processing device to perform operations comprising:
      receiving data representing a list of a plurality of subscribed services of a customer and corresponding usage histories from a first set of clouds;
      determining a plurality of candidate cloud environments in view of the list of the plurality of subscribed services of the customer;
      comparing the first set of clouds to the plurality of candidate cloud environments in view of the list of the plurality of subscribed services of the customer and the corresponding usage histories to generate a plurality of possible migration options for the plurality of candidate cloud environments;

receiving a set of candidate cloud environments selected from the plurality of possible migration options for the plurality of cloud environments; and migrating the plurality of subscribed services of the customer to the set of candidate cloud environments.

11. The system of claim 10, wherein the processing device is further to perform operations comprising:

producing a report of the plurality of candidate cloud environments in view of the comparison.

12. The system of claim 11, wherein the processing device is further to perform operations comprising:

supplying the report of the plurality of candidate cloud environments to the customer.

13. The system of claim 12, wherein the processing device is further to perform operations comprising:

determining a second set of clouds from the plurality of candidate cloud environments in view of a result of the comparing.

14. The system of claim 13, wherein the processing device is further to perform operations comprising:

migrating the plurality of subscribed services of the customer from the first set of clouds to the second set of clouds.

15. The system of claim 10, wherein the subscribed services comprise at least one of, identity management services, firewall services, security services, messaging services, data storage services, backup services, file maintenance services, network services, language services, authorization services, information technology services, information technology support services, commerce services, business intelligence services, web hosting services, web design services, or advertising services.

16. The system of claim 10, wherein the corresponding usage histories comprise:

at least one of, instances of the subscribed service, cloud utilization, cost per instance of subscribed service, cost per total instances of subscribed service, duration of instances, cost of cloud utilization, or total cost for subscribed services.

17. The system of claim 10, wherein the operation of comparing the first set of cloud computing environments to the plurality of candidate cloud environments in view of the usage histories comprises:

comparing cloud utilization and cost of cloud utilization between the first set of cloud computing environments and the candidate cloud environments.

18. A non-transitory machine-readable storage medium including instructions that, when executed by a processing device, cause the processing device to perform operations comprising:

receiving data representing a list of a plurality of subscribed services of a customer and corresponding usage histories from a first set of clouds;

determining a plurality of candidate cloud environments in view of the list of the plurality of subscribed services of the customer;

comparing, by a processing device, the first set of clouds to the plurality of candidate cloud environments in view of the list of the plurality of subscribed services of the customer and the corresponding usage histories to generate a plurality of possible migration options for the plurality of candidate cloud environments;

receiving a set of candidate cloud environments selected from the plurality of possible migration options for the plurality of cloud environments; and migrating the plurality of subscribed services of the customer to the set of candidate cloud environments.

19. The non-transitory machine-readable storage medium of claim 18, wherein the operations further comprises: producing a report of possible migration options for the plurality of candidate cloud environments in view of the comparison.

20. The non-transitory machine-readable storage medium of claim 19, wherein producing the report of the possible migration options for the plurality of candidate cloud environments in view of the comparison, further comprises:

receiving a list of customer criteria; and ranking the plurality of candidate cloud environments in view of the list of customer criteria.

* * * * *